(No Model.)
G. W. STEWART
CAR AXLE.
No. 293,201. Patented Feb. 5, 1884.
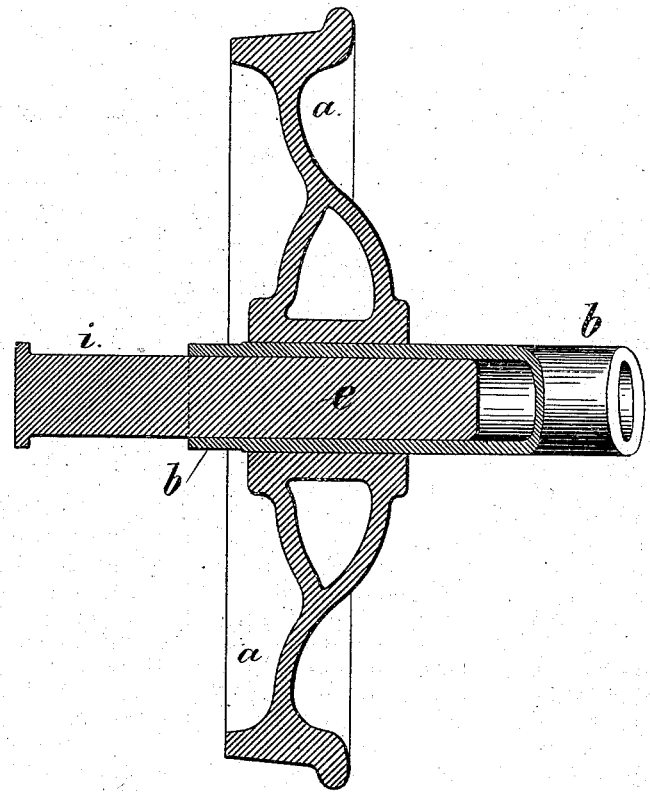
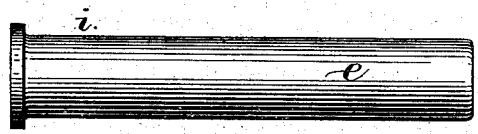
Witnesses
Chas H Smith
J. Staib
Inventor
George W. Stewart
per
Lemuel W. Serrell
Atty

UNITED STATES PATENT OFFICE.

GEORGE W. STEWART, OF ATLANTA, GEORGIA, ASSIGNOR TO JAMES F. WENMAN, OF NEW YORK, N. Y.

CAR-AXLE.

SPECIFICATION forming part of Letters Patent No. 293,201, dated February 5, 1884.

Application filed October 8, 1883. (No model.)

*To all whom it may concern:*

Be it known that I, GEORGE W. STEWART, of Atlanta, in the State of Georgia, have invented an Improvement in Railway-Car Axles, of which the following is a specification.

Railway-car axles have been made of metal tubes, with the journal forged as a part of the tube. In most instances, however, the axle is solid and the journal forged of a smaller diameter and provided with a collar. When the journal has worn down too small for safety, the wheels are forced off by hydraulic pressure and the axle is reforged, the journals being cut off and new pieces welded on. In removing the wheels from the axle the eyes of the wheels are slightly enlarged, and the axle has to be proportionately larger for fitting the wheels when replaced. In some instances the journal has been removable and attached to the wheel by screw-bolts, or driven into a central hole in the wheel itself, or into a bushing that unites the axle and journal.

The object of my present invention is to allow for replacing journals when worn without the axle being reforged, and without injury to any of the parts, and by my improvement the cost of manufacture or repair is very much lessened.

In the drawings, Figure 1 is a section of one end of the axle and wheel, and Fig. 2 represents the journal separately.

The car-wheels $a$ are of any usual character. The axle $b$ is tubular, and of wrought metal, preferably steel, and the exterior of the tube $b$ is turned off at the ends, to fit the eyes of the wheels, and the wheels are pressed on by a powerful press—such as a hydraulic press—as usual. The tubular axle extends but a slight distance beyond the wheels, and its interior surface near the ends is bored out true with a suitable drill, reamer, or tool, and the ends $e$ of the journal $i$ are turned of a size to fit tightly into the tube. I prefer to make the journals of steel, and to force them into the tubular axle after the wheels have been driven upon the axle; but the journals may be driven into the tubular axle before the wheels are put in place. I also remark that the tubular axle may be split near the ends, so as to allow the same to expand slightly as the inner ends of the journals are forced into place.

It is well known that the wheels of cars are not liable to become loose when driven upon the axle by hydraulic power, the journal, when properly fitted and driven into the tubular axle, will not be liable to become loose, and the axle will be better adapted to withstand torsion and jar than heretofore, because of being tubular, and there is no wear upon the axle, and when the journals are worn down too small they can be withdrawn by suitable mechanism—such as a hydraulic press—and new journals substituted, thus greatly facilitating both construction and repairs.

The ends $e$ of the journals may be very slightly tapering, so as to insure the necessary permanence when driven into place.

I claim as my invention—

The tubular axle and wheel, united by the wheel being driven upon the tubular axle so that the end of said axle passes through the wheel, in combination with a journal having a solid projecting inner end that fits the interior of the tubular axle and is driven tightly into the same, but is removable therefrom, substantially as set forth.

Signed by me this 5th day of October, A. D. 1883.

GEORGE W. STEWART.

Witnesses:
   H. E. STREET,
   W. H. RITCH.